(12) United States Patent  
Mochizuka

(10) Patent No.: US 11,886,054 B2  
(45) Date of Patent: Jan. 30, 2024

(54) LIGHT TRANSMISSIVE ELEMENT

(71) Applicant: MURAKAMI CORPORATION, Shizuoka (JP)

(72) Inventor: Takuo Mochizuka, Shimada (JP)

(73) Assignee: MURAKAMI CORPORATION, Shizuoka (JP)

( * ) Notice: Subject to any disclaimer, the term of this patent is extended or adjusted under 35 U.S.C. 154(b) by 771 days.

(21) Appl. No.: 17/041,694

(22) PCT Filed: Mar. 25, 2019

(86) PCT No.: PCT/JP2019/012432  
§ 371 (c)(1),  
(2) Date: Sep. 25, 2020

(87) PCT Pub. No.: WO2019/188952  
PCT Pub. Date: Oct. 3, 2019

(65) Prior Publication Data  
US 2021/0011310 A1 Jan. 14, 2021

(30) Foreign Application Priority Data  
Mar. 30, 2018 (JP) ................................. 2018-069404

(51) Int. Cl.  
*G02F 1/01* (2006.01)  
*G02F 1/155* (2006.01)

(52) U.S. Cl.  
CPC ............ *G02F 1/0123* (2013.01); *G02F 1/155* (2013.01); *G02F 2202/16* (2013.01)

(58) Field of Classification Search  
None  
See application file for complete search history.

(56) References Cited

U.S. PATENT DOCUMENTS

| 6,798,556 B2 * | 9/2004 | Tench ...................... E06B 9/24 |
| | | 359/269 |
| 9,690,163 B2 | 6/2017 | Mochizuka |

(Continued)

FOREIGN PATENT DOCUMENTS

| CN | 105829960 A | 8/2016 |
| JP | 62-019631 U | 2/1987 |

(Continued)

OTHER PUBLICATIONS

"Filter Usage for Taking Higher-Quality Photos", (searched on Mar. 14, 2018) the Internet <URL: http://www.kenko-tokina.co.jp/imaging/filter/kaneko/nd_page_01.html>, (including English Language Translation).

(Continued)

*Primary Examiner* — Robert E. Tallman  
(74) *Attorney, Agent, or Firm* — GREENBLUM & BERNSTEIN, P.L.C.

(57) ABSTRACT

A light transmissive element includes a light transmissive area. The element includes transparent substrates including respective transparent conductive films on respective surfaces thereof. The element has a structure in which the transparent substrates are disposed so as to face each other across a gap with the transparent conductive films facing each other and the gap is filled with an electrolyte. The electrolyte contains a metal ion and is prepared so as to allow the metal ion to be reversibly deposited on a surface of a transparent conductive film via electrodeposition according to a state of applied voltage between the transparent conductive film and the transparent conductive film. In the light transmissive area, a dividing line is formed in the transparent conductive film. The transparent conductive film includes divisional areas in the light transmissive area, the (Continued)

divisional areas being electrically insulated from each other by the dividing line.

11 Claims, 10 Drawing Sheets

(56) References Cited

U.S. PATENT DOCUMENTS

| | | | | |
|---|---|---|---|---|
| 10,301,871 | B2* | 5/2019 | Shrivastava | ............ G09F 23/02 |
| 2005/0248825 | A1* | 11/2005 | Warren | ................ G02F 1/1506 |
| | | | | 359/265 |
| 2015/0146276 | A1 | 5/2015 | Kim et al. | |
| 2016/0313626 | A1 | 10/2016 | Mochizuka | |

FOREIGN PATENT DOCUMENTS

| | | |
|---|---|---|
| JP | 62-198835 A | 9/1987 |
| JP | 07-005497 A | 1/1995 |
| JP | 2010-002573 A | 1/2010 |
| JP | 2016-157064 A | 9/2016 |

OTHER PUBLICATIONS

"Succeeded in Development of Light Control Glass That Exhibits Gradational Change", (searched on Mar. 14, 2018) the Internet <URL: http://www.nims.go.jp/news/press/2017/10/201710170. html>, (including English Language Translation, "Gradation-Tint Smart Window", Oct. 17, 2017).

International Search Report, dated Jun. 4, 2019, in International Application No. PCT/JP2019/012432 (including English Language Translation).

Written Opinion, dated Jun. 4, 2019, in International Application No. PCT/JP2019/012432 (including English Language Translation).

First Notification of Reasons for Refusal (The First Office Action, English Language Translation) issued for the counterpart Chinese Patent Application No. 2019800242389, dated Nov. 21, 2022.

Notification of Reasons for Refusal (including English Language Translation) issued for the counterpart Japanese Patent Application No. 2020-510059, dated Nov. 29, 2022.

* cited by examiner

LIGHT TRANSMISSIVE ELEMENT

The disclosure of Japanese Patent Application No. JP2018-069404 filed on Mar. 30, 2018 including the specification, drawings, claims and abstract is incorporated herein by reference in its entirety.

TECHNICAL FIELD

This invention relates to a light transmissive element configured such that a transmittance can partially be changed.

BACKGROUND ART

Non-Patent Literatures 1 and 2 each describe a light transmissive element including areas having different transmittances. The element described in Non-Patent Literature 1 is an optical element that is what is called a half ND filter. The half ND filter has a high transmittance area and a low transmittance area segmented by depositing a metal such as chrome by vapor deposition on a part of an entire surface of the element. The half ND filter has two types: a hard type in which a boundary between a high transmittance area and a low transmittance area is clear, and a soft type in which the boundary is blurred (gradated).

The element described in Non-Patent Literature 2 is light control glass. The light control glass uses a polymer (organic/metal hybrid polymer) having an electrochromic property to make a transmittance changeable in such a manner that a range of a high transmittance area and a range of a low transmittance area can freely be changed. A boundary between the high transmittance area and the low transmittance area is blurred.

CITATION LIST

Non-Patent Literature

[Non-Patent Literature 1] "Filter Usage for Taking Higher-Quality Photos", [searched on Mar. 14, 2018], the Internet <URL: http://www.kenko-tokina.co.jp/imaging/filter/kaneko/nd_page_01.html>

[Non-Patent Literature 2] "Succeeded in Development of Light Control Glass That Exhibits Gradational Change", [searched on Mar. 14, 2018], the Internet <URL: http://www.nims.go.jp/news/press/2017/10/201710170.html>

SUMMARY OF INVENTION

Technical Problem

In the element described in Non-Patent Literature 1, the transmittances of the respective areas are fixed and the transmittance of the low transmittance area is kept low and cannot be changed to a high transmittance (an optical density of the low transmittance area cannot be changed). The element described in Non-Patent Literature 2 is intended for a light shielding purpose such as a window of a vehicle or a building and is not intended for use as an optical filter. Also, the element described in Non-Patent Literature 2 employs a structure in which segmented transparent conductive films are connected via an ultrafine transparent conductive film, requiring fine patterning for disposition of the transparent conductive films.

This invention provides a light transmissive element configured such that a transmittance can partially be changed with no need for fine patterning of a transparent conductive film.

Solution to Problem

This invention provides a light transmissive element including a light transmissive area that functions as a light transmissive element, wherein: the light transmissive element has a structure in which a first transparent substrate including a first transparent conductive film on a surface thereof and a second transparent substrate including a second transparent conductive film on a surface thereof are disposed so as to face each other across a gap with the first transparent conductive film and the second transparent conductive film facing each other and the gap is filled with an electrolyte; the electrolyte contains a metal ion and is prepared so as to allow the metal ion to be reversibly deposited on a surface of the first transparent conductive film or the second transparent conductive film via electrodeposition according to a state of applied voltage between the first transparent conductive film and the second transparent conductive film; in the light transmissive area, a first dividing line is formed in the first transparent conductive film; and the first transparent conductive film includes a first-first divisional area and a first-second divisional area in the light transmissive area, the first-first divisional area and the first-second divisional area being electrically insulated from each other by the first dividing line. Accordingly, a transmittance of the light transmissive area can partially be changed according to a state of applied voltage between the first transparent conductive film and the second transparent conductive film.

It is possible that in the light transmissive area, a layer structure, from the first transparent substrate to the second transparent substrate, of the light transmissive element is same between an area facing the first-first divisional area and an area facing the first-second divisional area. Accordingly, when the area facing the first-first divisional area and the area facing the first-second divisional area both have a high transmittance, respective transmission characteristics of the area facing the first-first divisional area and the area facing the first-second divisional area can be made to be equal to each other.

It is possible that in the light transmissive area, the second transparent conductive film includes a continuous area with no dividing line. Accordingly, the transmittance of the light transmissive area can partially be changed by, for example, selectively applying a voltage between the first-first divisional area and the second transparent conductive film or between the first-second divisional area and the second transparent conductive film. Also, transmittances of both the area facing the first-first divisional area and the area facing the first-second divisional area in the light transmissive area can be changed by applying a voltage both between the first-first divisional area and the second transparent conductive film and between the first-second divisional area and the second transparent conductive film.

It is possible that: the light transmissive element includes a first-first metal electrode and a second metal electrode; the first-first metal electrode is connected to the first-first divisional area and is not connected to the first-second divisional area; and the second metal electrode is connected to the second transparent conductive film. Accordingly, a state in which the area facing the first-first divisional area in the light transmissive area has a low transmittance and the area facing the first-second divisional area in the light transmissive area has a high transmittance can be obtained by, for example, applying a voltage between the first-first metal electrode and the second metal electrode. Also, a state in which the area facing the first-first divisional area in the light transmissive area and the area facing the first-second divisional area in the light transmissive area both have a high transmittance can be obtained by releasing the voltage between the first-first metal electrode and the second metal electrode.

It is possible that the second metal electrode is connected to the second transparent conductive film at a position where an area located between the first-first metal electrode and the second metal electrode with regard to a surface direction of the light transmissive element is present in an area facing the first-first divisional area and is not present in an area facing the first-second divisional area. Accordingly, for example, when a voltage is applied to the first-first metal electrode and the second metal electrode, a boundary between a low transmittance area (the area facing the first-first divisional area) and a high transmittance area (the area facing the first-second divisional area) can be made clear (sharp) by making a transmittance change gradient at the boundary steep. In this case, the boundary between the low transmittance area and the high transmittance area can particularly be made clear by making deposition of the metal ion occur on the first transparent conductive film side having the dividing line. This light transmissive element can be used, for example, as a hard-type half ND filter that is electrically switchable between a filter-provided (on) state and a no filter-provided (off) state.

It is possible that the second metal electrode is connected to the second transparent conductive film at a position where an area located between the first-first metal electrode and the second metal electrode with regard to a surface direction of the light transmissive element is present in an area facing both the first-first divisional area and the first-second divisional area. Accordingly, for example, when a voltage is applied between the first-first metal electrode and the second metal electrode, a boundary between a low transmittance area and a high transmittance area can be blurred by making a transmittance change gradient at the boundary low. In this case, the boundary can be blurred by making deposition of the metal ion occur either on the first transparent conductive film side or on the second transparent conductive film side. This light transmissive element can be used, for example, as a soft-type half ND filter having a filter function switchable between on and off states.

It is possible that: the second metal electrode includes a second-first metal electrode and a second-second metal electrode separated from each other; the second-first metal electrode is connected to the second transparent conductive film at a position where an area located between the first-first metal electrode and the second-first metal electrode with regard to a surface direction of the light transmissive element is present in an area facing the first-first divisional area and is not present in an area facing the first-second divisional area; and the second-second metal electrode is connected to the second transparent conductive film at a position where an area located between the first-first metal electrode and the second-second metal electrode with regard to the surface direction of the light transmissive element is present in an area facing both the first-first divisional area and the first-second divisional area. Accordingly, a degree of clearness of a boundary between a low transmittance area and a high transmittance area can be changed according to a state of applied voltage. For example, a boundary between a low transmittance area and a high transmittance area can be made clear by applying a voltage between the first-first metal electrode and the second-first metal electrode and applying no voltage between the first-first metal electrode and the second-second metal electrode. Also, the boundary between the low transmittance area and the high transmittance area can be blurred by applying a voltage both between the first-first metal electrode and the second-first metal electrode and between the first-first metal electrode and the second-second metal electrode. This light transmissive element can be used, for example, as a half ND filter that has a filter function switchable between on and off states and is switchable between a hard-type and a soft-type.

In this invention, it is possible that: in the light transmissive area, a second dividing line is formed in the second transparent conductive film; and the second transparent conductive film includes a second-first divisional area and a second-second divisional area in the light transmissive area, the second-first divisional area and the second-second divisional area being electrically insulated from each other by the second dividing line. Accordingly, the transmittance of the light transmissive area can partially be changed by, for example, selectively applying a voltage between one of the first-first divisional area and the first-second divisional area and one of the second-first divisional area and the second-second divisional area. Also, transmittances of both the area facing the first-first divisional area and the area facing the first-second divisional area (both an area facing the second-first divisional area and an area facing the second-second divisional area) in the light transmissive area can be changed by applying a voltage between the first-first divisional area and first-second divisional area, and second-first divisional area and the second-second divisional area.

It is possible that: in the light transmissive area, the first dividing line and the second dividing line are formed at respective positions at which the first dividing line and the second dividing line overlap each other; and the first-first divisional area and the second-first divisional area are disposed so as to face each other and the first-second divisional area and the second-second divisional area are disposed so as to face each other. Accordingly, the transmittance of the light transmissive area can partially be changed by, for example, selectively applying a voltage between the first-first divisional area and the second-first divisional area or between the first-second divisional area and the second-second divisional area. Also, the transmittances of both the area facing the first-first divisional area and the area facing the first-second divisional area (both the area facing the second-first divisional area and the area facing the second-second divisional area) in the light transmissive area can be changed by applying a voltage both between the first-first divisional area and the second-first divisional area and between the first-second divisional area and the second-second divisional area.

It is possible that: the light transmissive element includes a first-first metal electrode and a second metal electrode; the first-first metal electrode is connected to the first-first divisional area and is not connected to the first-second divisional area; and the second metal electrode is connected to the second-first divisional area and is not connected to the second-second divisional area. Accordingly, for example, when a voltage is applied between the first-first metal electrode and the second metal electrode, a boundary between a low transmittance area (the area facing the first-first divisional area) and a high transmittance area (the area facing the first-second divisional area) can be made clear by making a transmittance change gradient at the boundary steep. In this case, the boundary between the low transmittance area and the high transmittance area can be made clear by making deposition of the metal ion occur either on the first transparent conductive film side or the second transparent conductive film side. This light transmissive element can be used, for example, as a hard-type half ND filter having a filter function switchable between on and off states.

It is possible that: the light transmissive element includes a first-first metal electrode and a second metal electrode; the first-first metal electrode is connected to the first-first divisional area and is not connected to the first-second divisional area; and the second metal electrode is connected to the second-first divisional area and the second-second divisional area. Accordingly, for example, when a voltage is applied between the first-first metal electrode and the second metal electrode, a boundary between a low transmittance area and a high transmittance area can be blurred by making a transmittance change gradient gentle. In this case, the boundary can be blurred by making deposition of the metal ion occur either on the first transparent conductive film side or the second transparent conductive film side. This light transmissive element can be used, for example, as a soft-type half ND filter having a filter function switchable between on and off states.

It is possible that: the second metal electrode includes a second-first metal electrode and a second-second metal electrode separated from each other; the second-first metal electrode is connected to the second-first divisional area and is not connected to the second-second divisional area; and the second-second metal electrode is connected to the second-second divisional area and is not connected to the second-first divisional area. Accordingly, a degree of clearness of a boundary between a low transmittance area and a high transmittance area can be changed according to a state of applied voltage. For example, a boundary between a low transmittance area and a high transmittance area can be made clear by applying a voltage between the first-first metal electrode and the second-first metal electrode and applying no voltage between the first-first metal electrode and the second-second metal electrode. Also, the boundary between the low transmittance area and the high transmittance area can be blurred by applying a voltage both between the first-first metal electrode and the second-first metal electrode and between the first-first metal electrode and the second-second metal electrode. This light transmissive element can be used, for example, a half ND filter that has a filter function switchable between on and off states and is switchable between a hard-type and a soft-type.

It is possible that: the light transmissive element further includes a first-second metal electrode; and the first-second metal electrode is connected to the first-second divisional area and is not connected to the first-first divisional area. Accordingly, for example, both the area facing the first-first divisional area and the area facing the first-second divisional area can be made to have a low transmittance by applying a voltage between the first-first metal electrode and the first-second metal electrode, and the second metal electrode (or the second-first metal electrode and the second-second metal electrode). This light transmissive element can be used, for example, as a half ND filter that has a filter function switchable between on and off states and is switchable between a hard-type and a soft-type or a ND filter that is switchable between the half ND filter and a full ND filter.

DESCRIPTION OF EMBODIMENTS

Embodiment 1

Figure 1A:
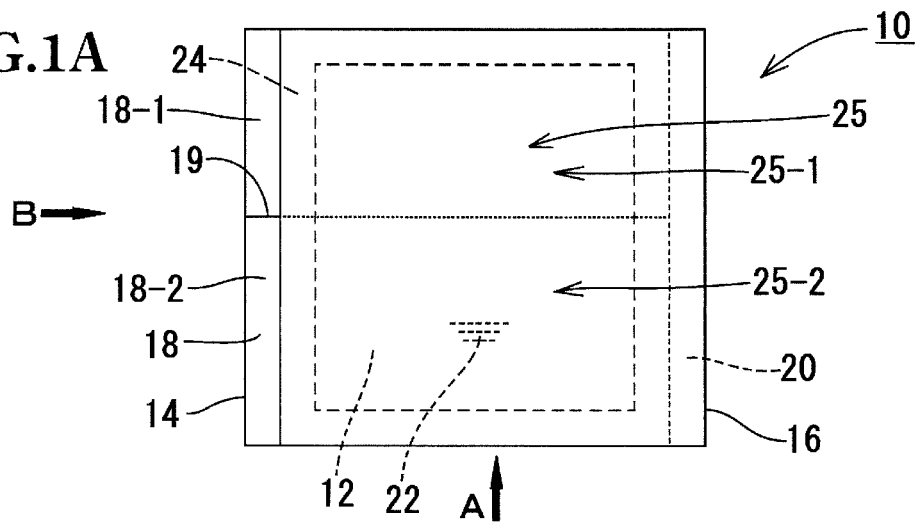
FIG. 1A is a schematic front view illustrating Embodiment 1 of a light transmissive element according to this invention.
Figure 1B:
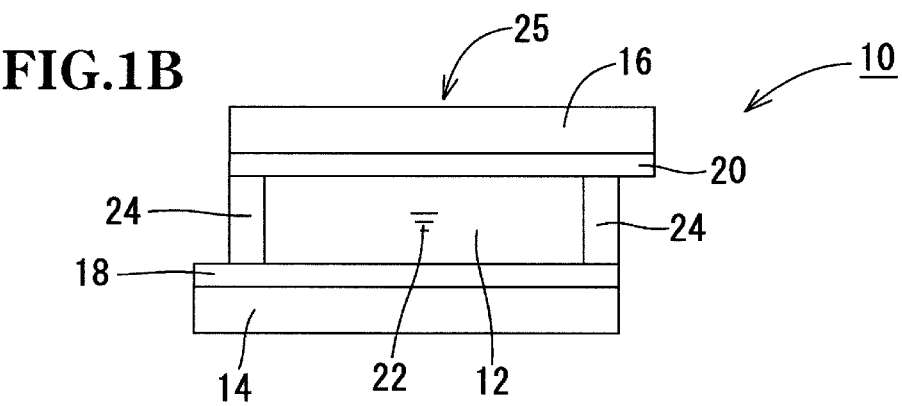
FIG. 1B is a schematic transparent view in the arrow A direction in FIG. 1A.
Figure 1C:
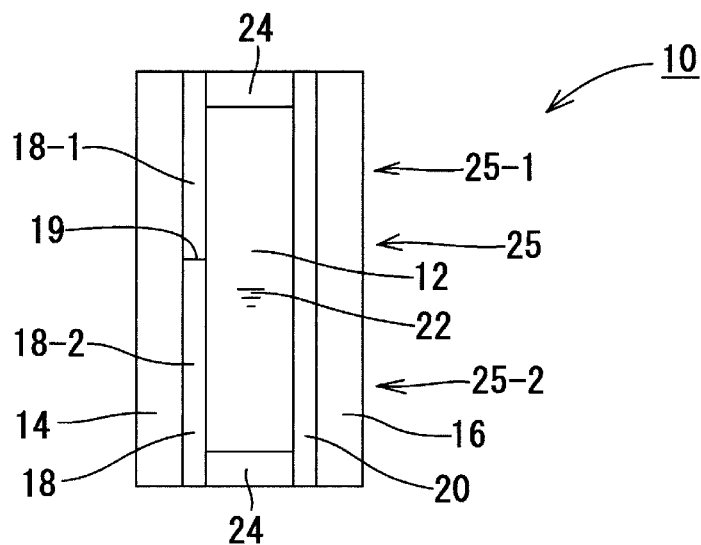
FIG. 1C is a schematic transparent view in the arrow B direction in FIG. 1A.

FIG. 1 (FIGS. 1A to 1C) illustrate Embodiment 1 of a light transmissive element according to this invention. Embodiment 1 has a structure that is the same as that of the light transmissive element described in FIG. 1 in the pamphlet of International Publication No. WO 2015/093298 filed by the present applicant except that a dividing line is formed in one of transparent conductive films. Both light transmissive elements are the same also in terms of electrolyte composition. A method for manufacturing the light transmissive element, the method including an electrolyte preparation method, is described in the same international publication pamphlet, and thus the pamphlet should be referred to. In FIG. 1, a light transmissive element 10 includes two transparent substrates 14 (first transparent substrate), 16 (second transparent substrate) each having a rectangular shape and formed of glass or resin, which are disposed so as to face each other across a gap 12. Front and back surfaces of each of the transparent substrates 14, 16 are flat and smooth. Transparent conductive films 18 (first transparent conductive film), 20 (second transparent conductive film) forming an electrode pair are formed on respective surfaces of the transparent substrates 14, 16, the surfaces facing each other. Each of the transparent conductive films 18, 20 is formed of, for example, ITO (indium tin oxide), tin oxide or zinc oxide. In the transparent conductive film 18, a dividing line 19 (first dividing line) is formed via, e.g., laser cutting or chemical etching. The dividing line 19 is linearly drawn between two edges of the transparent conductive film 18 having a rectangular planar shape, the two edges opposite to each other in a left-right direction in FIG. 1A, so as to reach the two edges. Consequently, the transparent conductive film 18 is divided in two rectangular divisional areas 18-1 (first-first divisional area), 18-2 (first-second divisional area) at an appropriate area ratio. The divisional areas 18-1, 18-2 are electrically insulated from each other. The transparent conductive film 20 is formed of a continuous single area with no dividing line. As illustrated in FIG. 1B, the transparent substrates 14, 16 are disposed with respective positions shifted from each other in a direction along the respective surfaces (left-right direction in FIGS. 1A and 1B) in order to connect the transparent conductive films 18, 20 to a drive circuit. This shifted disposition makes respective one ends of the divisional areas 18-1, 18-2 of the transparent conductive film 18 (left end in FIG. 1A) and one end of the transparent conductive film 20 (right end in FIG. 1A) are exposed to the external world. The gap 12 is filled with an electrolyte 22. A periphery of the gap 12 is sealed by a sealing member 24. An entire inner peripheral-side area of the entire surface of the light transmissive element 10, the area being surrounded by the sealing member 24, forms a light transmissive area 25 that functions as a light transmissive element. The light transmissive area 25 is transparent (high transmittance) in its entirety in a thickness direction of the light transmissive element 10 when a voltage between the transparent conductive films 18, 20 is released (a state in which no voltage is applied). At this time, the light transmissive area 25 has an optical characteristic (that is, a transmission characteristic, a reflection characteristic) that is uniform over the entire area. The light transmissive area 25 is divided in an area 25-1 facing the divisional area 18-1 and an area 25-2 facing the divisional area 18-2 with the dividing line 19 as a boundary. For the electrolyte 22, for example, an electrolyte having the following composition can be used. In other words, for a solvent, a solvent formed of a non-aqueous solvent containing a non-aqueous solvent having a boiling point that is higher than that of methanol and methanol, a content by weight of which is smaller than that of the non-aqueous solvent, is used. The electrolyte 22 has a composition in which at least silver ions and copper ions, a content by weight of which is smaller than that of the silver ions, are contained in the solvent. Here, the electrolyte 22 is formed by dissolving $AgNO_3$ (silver nitrate), $CuCl_2$ (copper chloride) and LiBr, which is a supporting electrolyte, as solutes in a non-aqueous solvent containing propylene carbonate as a main component (component having a largest content by weight) and methanol as an accessary component (component having a content by weight that is smaller than that of the main component). A content by weight of the silver nitrate in the electrolyte 22 is larger than that of the copper chloride. As a thickener, a polymer such as polypropylene, polyvinyl butyral or polymethyl methacrylate can be added in the electrolyte 22.

Embodiment 1-1

Figure 2A:
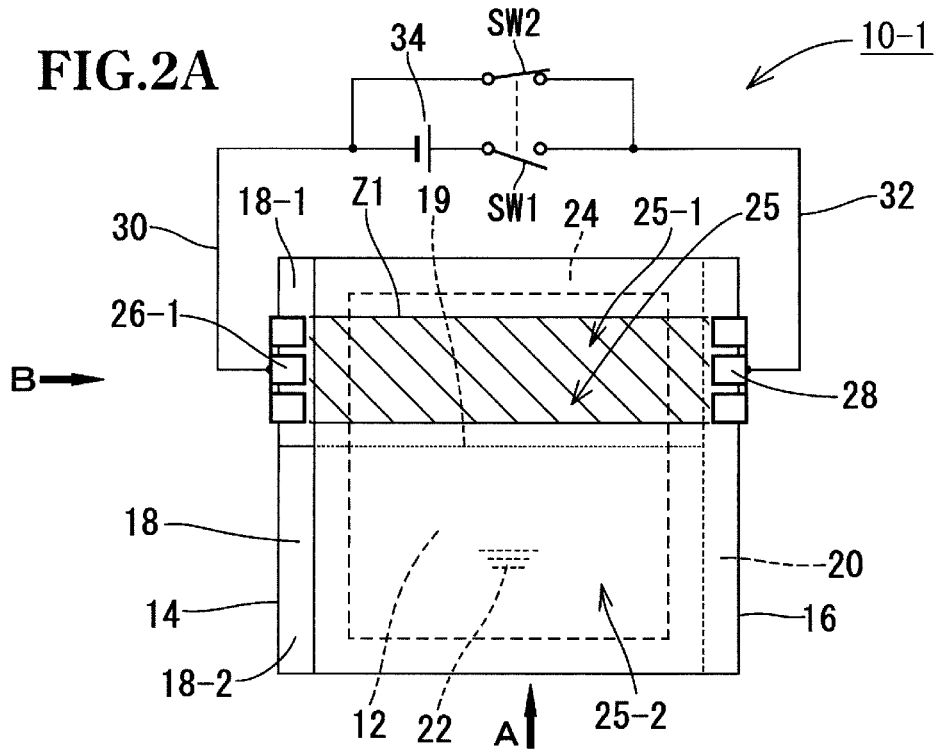
FIG. 2A is a schematic front view illustrating Embodiment 1-1 of a light transmissive element according to this invention in which metal electrodes and a drive circuit are added to the light transmissive element of Embodiment 1.
Figure 2B:
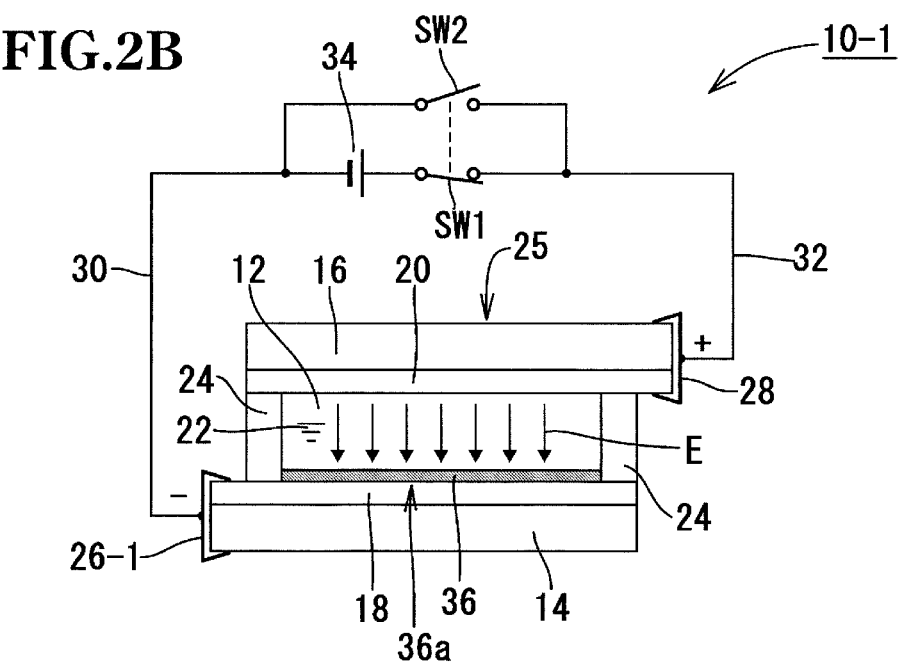
FIG. 2B is a schematic transparent view in the arrow A direction in FIG. 2A.
Figure 2C:
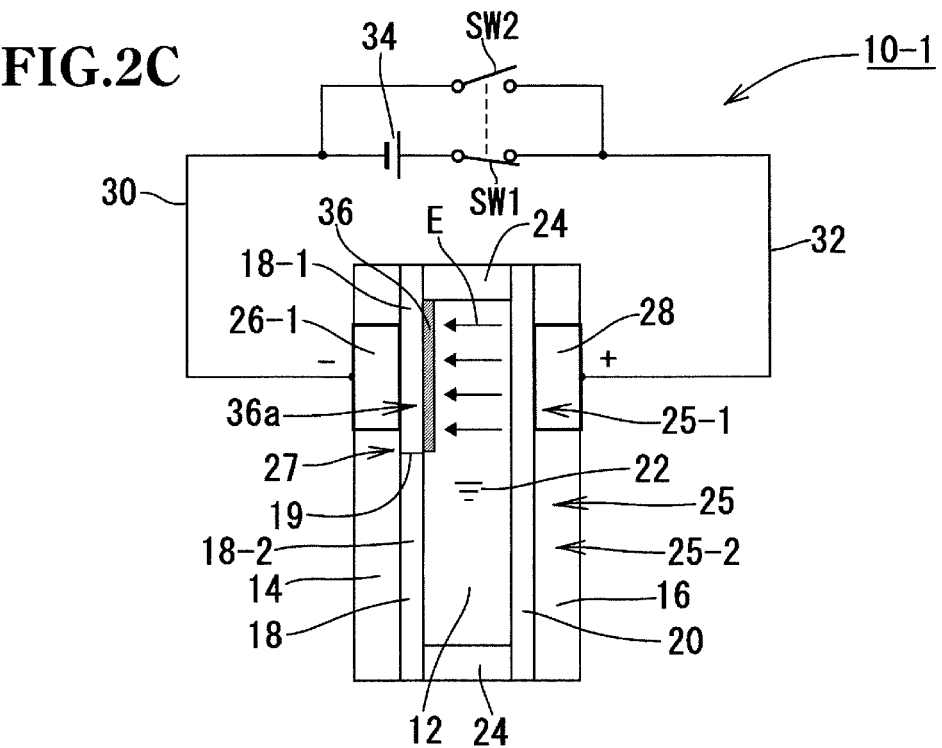
FIG. 2C is a schematic transparent view in the arrow B direction in FIG. 2A.

FIG. 2 (FIGS. 2A to 2C) illustrate Embodiment 1-1 of a light transmissive element according to this invention in which metal electrodes and a drive circuit are added to the light transmissive element 10 of Embodiment 1. The light transmissive element 10-1 is switchable between a state in which an entire light transmissive area 25 has a high transmittance and a state in which the light transmissive area 25 is segmented such that an area 25-1 facing a divisional area 18-1 has a low transmittance and an area 25-2 facing a divisional area 18-2 has a high transmittance. In the state in which the light transmissive area 25 is segmented into the low transmittance area and the high transmittance area, a clear boundary can be obtained between both areas. The light transmissive element 10-1 is formed by attaching metal electrodes to the light transmissive element 10 of FIG. 1 and connecting a drive circuit to the metal electrodes. In FIGS. 2A and 2B, a clip electrode 26-1 (first-first metal electrode) formed of metal is attached so as to pinch a left edge of a transparent substrate 14 at a place at which the divisional area 18-1 in the transparent conductive film 18 is exposed. Consequently, the clip electrode 26-1 is electrically connected to the divisional area 18-1 and is electrically disconnected from (that is, electrically insulated from) the divisional area 18-2. A clip electrode 28 (second metal electrode) formed of metal is attached so as to pinch a right edge of a transparent substrate 16 at a place at which a transparent conductive film 20 is exposed, the place being located at a position at which the clip electrode 28 is opposite to the clip electrode 26-1 in a left-right direction in the front view in FIG. 2A. Consequently, the clip electrode 28 is electrically connected to the entire area of the transparent conductive film 20. The clip electrodes 26-1, 28 are equal to each other in length (length in the vertical direction in FIG. 2A). Here, Z1 is an area in a surface direction of the light transmissive element 10-1, the area being located between the clip electrodes 26-1, 28 (FIG. 2A). This area Z1 is an area located between a straight line connecting respective upper ends of the clip electrodes 26-1, 28 and a straight line connecting respective lower ends of the clip electrodes 26-1, 28 in the front view in FIG. 2A. The clip electrodes 26-1, 28 are disposed at respective positions that allow the area Z1 to be present in the area facing the divisional area 18-1 and not to be present in the area facing the divisional area 18-2. Respective one ends of lead wires 30, 32 are connected to the clip electrodes 26-1, 28, respectively. A serial connection circuit including a direct-current power supply 34 and a switch SW1 is connected between respective other ends of the lead wires 30, 32. Also, between the lead wires 30, 32, a switch SW2 is connected in parallel with the serial connection circuit including the switch SW1 and the direct-current power supply 34. The switches SW1, SW2 are turned on or off in interlocking with each other in respective directions opposite to each other. The switches SW1, SW2 can also be both turned off. Upon the switches SW1, SW2 being both turned off, the transparent conductive film 20 and the divisional area 18-1 are open-circuited therebetween.

Operation of the light transmissive element 10-1 having the above configuration will be described. When the switch SW1 is off and the switch SW2 is on as in FIG. 2A, the transparent conductive film 20 and the divisional area 18-1 are short-circuited, and thus, no electric field is generated between the transparent conductive film 20 and the divisional area 18-1. Also, since the divisional area 18-2 has no potential (floating potential), no electric field is generated also between the divisional area 18-2 and the transparent conductive film 20. Therefore, metal cations $Ag^+$, $Cu^{2+}$ and anions $NO_3^-$, $Cl^-$ are in a state of being dispersed in an electrolyte 22. At this time, the electrolyte 22 is substantially colorless and transparent, and the light transmissive area 25 of the light transmissive element 10-1 is substantially colorless and transparent in its entirety in a thickness direction from the transparent substrate 14 up to the transparent substrate 16.

Upon the switch SW1 being turned on and the switch SW2 being turned off as in FIGS. 2B and 2C from the state in FIG. 2A, a voltage of the direct-current power supply 34 is applied between the transparent conductive film 20 and the divisional area 18-1 (the transparent conductive film 20 is set as a positive electrode and the divisional area 18-1 is set as a negative electrode) and an electric field E is generated in an area in which the transparent conductive film 20 and the divisional area 18-1 face each other. As illustrated in FIGS. 2B and 2C, the electric field E is generated so as to be directed straight from the transparent conductive film 20 toward the divisional area 18-1 (in a direction orthogonal to a surface of the divisional area 18-1). The electric field E causes the metal cations $Ag^+$, $Cu^{2+}$ in the electrolyte 22 to be moved to the surface of the divisional area 18-1, which is a negative electrode, and reduced. As a result, a deposition layer 36 containing silver as a main component with a small amount of copper mixed therein as an accessary component is deposited on the surface of the divisional area 18-1 and a low transmittance surface 36a provided by the deposition layer 36 appears. Consequently, the light transmissive element 10-1 forms a light transmissive element in which the area 25-1 of the light transmissive area 25, the area 25-1 facing the divisional area 18-1, has a low transmittance and the area 25-2 of the light transmissive area 25, the area 25-2 facing the divisional area 18-2, has a high transmittance. The transmittance of the area 25-1 becomes lower as the time of energization is longer and is saturated upon being lowered to a certain transmittance. The energization is stopped at an arbitrary transmittance (switches SW1, SW2 are both turned off) before the transmittance is saturated, enabling the transmittance to be kept. If the switches SW1, SW2 are both left off, the transmittance gradually raises; however, a desired transmittance can be maintained by periodically turning switch SW1 on or off (the switch SW2 being kept off). Note that either of front and back sides of the light transmissive element 10-1 can be used as the entrance side or the exit side of transmitted light (the same applies to each of the later-described embodiments).

Upon the switch SW1 being turned off and the switch SW2 being turned on again as in FIG. 2A from the state in FIGS. 2B and 2C, the transparent conductive film 20 and the divisional area 18-1 are short-circuited and the electric field between the transparent conductive film 20 and the divisional area 18-1 disappears. Consequently, the silver and the copper forming the deposition layer 36 are oxidized and detached from the surface of the divisional area 18-1 and becomes metal cations $Ag^+$, $Cu^{2+}$, which are then dispersed again in the electrolyte 22. Such detachment is possible because the deposition layer 36 is formed by copper being mixed in silver, which is a main component. As a result, the transmittance of the area 25-1 facing the divisional area 18-1 increases and the entirety of the light transmissive area 25 returns to an original transparent state. Note that instead of the transparent conductive film 20 and the divisional area 18-1 being short-circuited, the transparent conductive film 20 and the divisional area 18-1 can be open-circuited by turning off both switches SW1, SW2. At this time, the electric field between the transparent conductive film 20 and the divisional area 18-1 disappears, and thus, the area 25-1 facing the divisional area 18-1 can be returned to the original transparent state by metal cations $Ag^+$, $Cu^{2+}$ being detached from the divisional area 18-1 (negative electrode). In other words, upon the transparent conductive film 20 and the divisional area 18-1 being open-circuited by turning off both switches SW1, SW2 from the state in FIGS. 2B and 2C, the transmittance of the area 25-1 facing the divisional area 18-1 increases at a slow rate in comparison with a case where the transparent conductive film 20 and the divisional area 18-1 are short-circuited and returns to the original transparent state.

In such a manner as above, the transmittance of the area 25-1 facing the divisional area 18-1 can reversibly be changed by applying an electric field between the transparent conductive film 20 and the divisional area 18-1 and releasing the application of the electric field.

Figure 3:
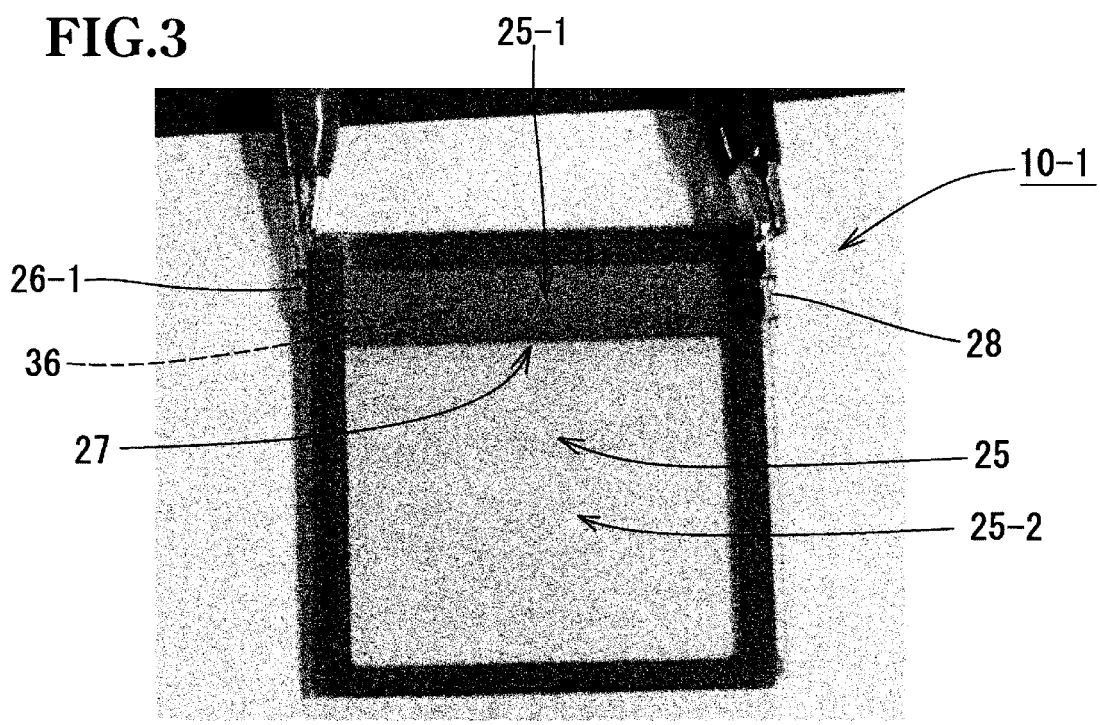
FIG. 3 is a photograph of a sample of the light transmissive element of Embodiment 1-1 as viewed from the front, which indicates a state in which an area of a light transmissive area, the area facing a first-first divisional area, has a low transmittance.

FIG. 3 is a photograph of a sample of the light transmissive element 10-1 of Embodiment 1-1 as viewed from the front. In this sample, a dividing line 19 was formed so as to have a width on the order of micrometers by laser cutting. This photograph indicates a state in which a divisional area 18-1 has been set as a negative electrode through a clip electrode 26-1 and a transparent conductive film 20 has been set as a positive electrode through a clip electrode 28 and a voltage of approximately 2 volts has been applied to the electrodes for approximately 10 seconds and an area 25-1 on the upper side of a light transmissive area 25 consequently has a low transmittance. A deposition layer 36 in the area 25-1 exhibits a dark color and has characteristics that can be used as a ND filter. An area 25-2 on the lower side of the light transmissive area 25 is kept having a high transmittance because no voltage has been applied to the area 25-2. As can be seen from this photograph, a boundary 27 between the low transmittance area and the high transmittance area is clear (sharp).

The light transmissive element 10-1 can be used, for example, as a hard-type half ND filter (variable ND filter) for a camera. In other words, the light transmissive element 10-1 is disposed on an optical axis inside a camera, with the divisional area 18-1 on the upper side and the divisional area 18-2 on the lower side. When an entire surface of the light transmissive area 25 is made to have a high transmittance, no filter is provided and when the divisional area 18-1 is made to have a low transmittance, a hard-type half ND filter is provided. When a half ND filter for a camera is formed using the light transmissive element 10-1, it is desirable that the half ND filter provide a high transmittance in a transparent state. Therefore, in this case, it is desirable that the each of the transparent substrates 14, 16 be formed of optical glass (waterwhite glass) having a high transmittance and an antireflection film be formed on each of respective outer surfaces of the transparent substrates 14, 16.

Also, the light transmissive element 10-1 can be used also for a light control glass window for a building, a light control glass window for an automobile or an aircraft, or other purposes. At this time, the light transmissive element 10-1 is used with the divisional area 18-1 disposed on the upper side and the divisional area 18-2 disposed on the lower side. When sunlight is too bright, the divisional area 18-1 is set to a low transmittance to reduce the brightness. On other occasions, the entire surface is set to a high transmittance.

Embodiment 1-2

Figure 4A:
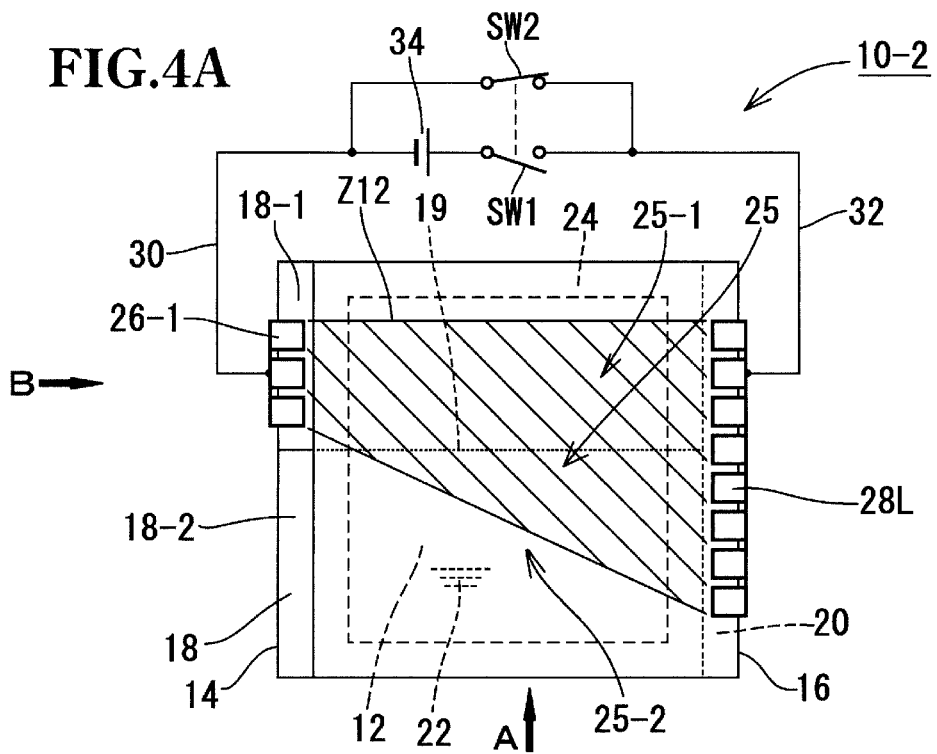
FIG. 4A is a schematic front view illustrating Embodiment 1-2 of a light transmissive element according to this invention in which metal electrodes and a drive circuit are added to the light transmissive element of Embodiment 1.
Figure 4B:
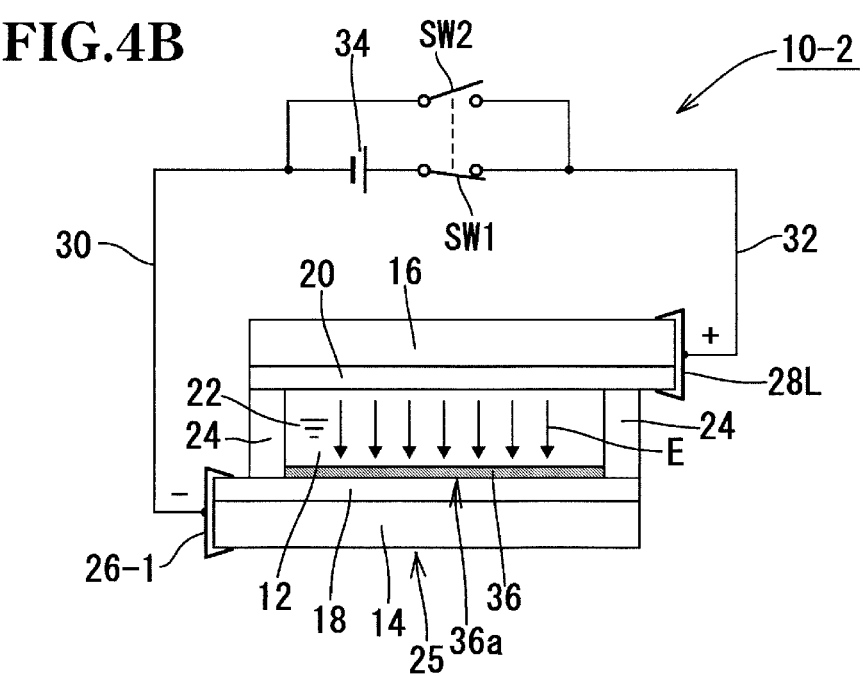
FIG. 4B is a schematic transparent view in the arrow A direction in FIG. 4A.
Figure 4C:
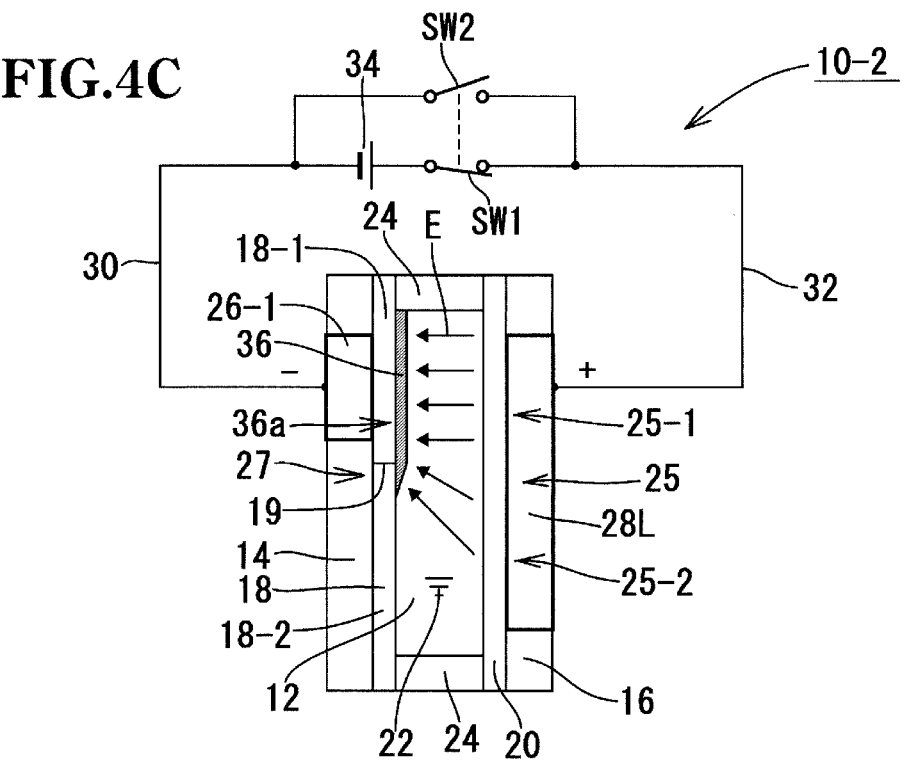
FIG. 4C is a schematic transparent view in the arrow B direction in FIG. 4A.

FIG. 4 (FIGS. 4A to 4C) illustrate Embodiment 1-2 of a light transmissive element according to this invention in which metal electrodes and a drive circuit are added to the light transmissive element 10 of Embodiment 1. As with Embodiment 1-1, a light transmissive element 10-2 is switchable between a state in which an entire light transmissive area 25 has a high transmittance and a state in which the light transmissive area 25 is segmented such that an area 25-1 facing a divisional area 18-1 has a low transmittance and an area 25-2 facing a divisional area 18-2 has a high transmittance. However, unlike the light transmissive element 10-1, in the state in which the light transmissive area 25 is segmented into the low transmittance area and the high transmittance area, a blurred boundary can be provided between both areas. The light transmissive element 10-2 has a configuration in which the clip electrode 28 (second metal electrode) of the light transmissive element 10-1 of Embodiment 1-1 (FIGS. 2A to 2O) is replaced with a long clip electrode 28L (second metal electrode). Here, Z12 is an area in a surface direction of the light transmissive element 10-2, the area being located between clip electrodes 26-1, 28L. The area Z12 is an area located between a straight line connecting respective upper ends of the clip electrodes 26-1, 28L and a straight line connecting respective lower ends of the clip electrodes 26-1, 28L in the front view in FIG. 4A. The clip electrode 28L is connected to a transparent conductive film 20 at a position where the area Z12 is present on both of the area facing the divisional area 18-1 and the area facing the divisional area 18-2 across a dividing line 19. A configuration of the light transmissive element 10-2 other than the clip electrode 28L is the same as that of the light transmissive element 10-1 of Embodiment 1-1.

Upon a switch SW1 being turned on and a switch SW2 being turned off as in FIGS. 4B and 4C from a state in which the switch SW1 is off and the switch SW2 is on in FIG. 4A, as with Embodiment 1-1, a deposition layer 36 is deposited on a surface of the divisional area 18-1 and a low transmittance surface 36a provided by the deposition layer 36 appears. However, in this case, unlike Embodiment 1-1, the clip electrode 28L is long, and thus, as illustrated in FIG. 4C, an electric field E between the transparent conductive film 20 and the divisional area 18-1 is generated not only in an area in which the divisional area 18-1 and the transparent conductive film 20 face each other straight on but also in an area in which the divisional area 18-1 and the transparent conductive film 20 face each other obliquely. In the area in which the divisional area 18-1 and the transparent conductive film 20 face each other straight on, the electric field E is directed straight from the transparent conductive film 20 toward the divisional area 18-1 (in a direction orthogonal to the surface of the divisional area 18-1). On the other hand, in the area in which the divisional area 18-1 and the transparent conductive film 20 face each other obliquely, the electric field E is obliquely directed from the transparent conductive film 20 toward the divisional area 18-1. As a result, the deposition layer 36 is slightly extended to the divisional area 18-2 side across the dividing line 19. However, a thickness of the deposition layer 36 is small, and in addition, a part of the deposition layer 36 forms a hydrate or an oxide, and thus, the deposition layer 36 does not have a low resistance value enough to be regarded as a conductor. Therefore, even though the deposition layer 36 is extended to the divisional area 18-2 side across the dividing line 19, the divisional areas 18-1, 18-2 are not short-circuited via the deposition layer 36. In other words, the divisional area 18-2 is kept having no potential. A part of the deposition layer 36, the part extending to the divisional area 18-2 side across the dividing line 19, becomes smaller in thickness as is farther from the dividing line 19. Therefore, a transmittance change gradient at a boundary 27 between the low transmittance area 25-1 on the upper side of the light transmissive area 25 and the high transmittance area 25-2 on the lower side of the light transmissive area 25 is gentle, and as a result, the boundary 27 is blurred (gradated).

Figure 5:
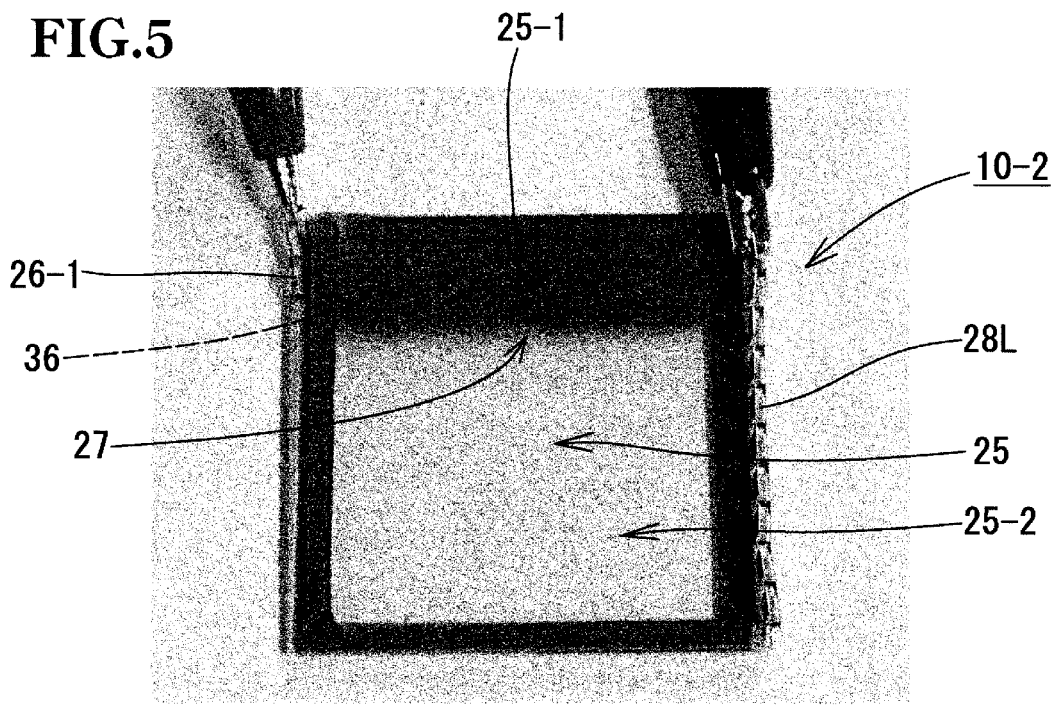
FIG. 5 is a photograph of a sample of the light transmissive element of Embodiment 1-2 as viewed from the front, which indicates a state in which an area of a light transmissive area, the area facing a first-first divisional area, has a low transmittance.

FIG. 5 is a photograph of a sample of the light transmissive element 10-2 of Embodiment 1-2 as viewed from the front. This sample has a configuration that is the same as that of the sample in the photograph in FIG. 3 except that the length of the clip electrode 28L is different from the length of the clip electrode 28 in the sample in the photograph in FIG. 3. This photograph indicates a state in which a clip electrode 26-1 has been set as a negative electrode and a clip electrode 28 has been set as a positive electrode and a voltage of approximately 2 volts has been applied to the electrodes for approximately 10 seconds and an area 25-1 on the upper side of a light transmissive area 25 consequently has a low transmittance. A deposition layer 36 in the area 25-1 exhibits a dark color and has characteristics that can be used as a ND filter. An area 25-2 on the lower side of the light transmissive area 25 is kept having a high transmittance because no voltage has been applied to the area 25-2. As can be seen in comparison with the photograph in FIG. 3, a boundary 27 between the low transmittance area and the high transmittance area is blurred.

The light transmissive element 10-2 can be used, for example, as a soft-type half ND filter (variable ND filter) for a camera. Also, the light transmissive element 10-2 can be used for a light control glass window for a building, a light control glass window for an automobile or an aircraft, or other purposes.

Alternation of Embodiment 1-2

Figure 6:
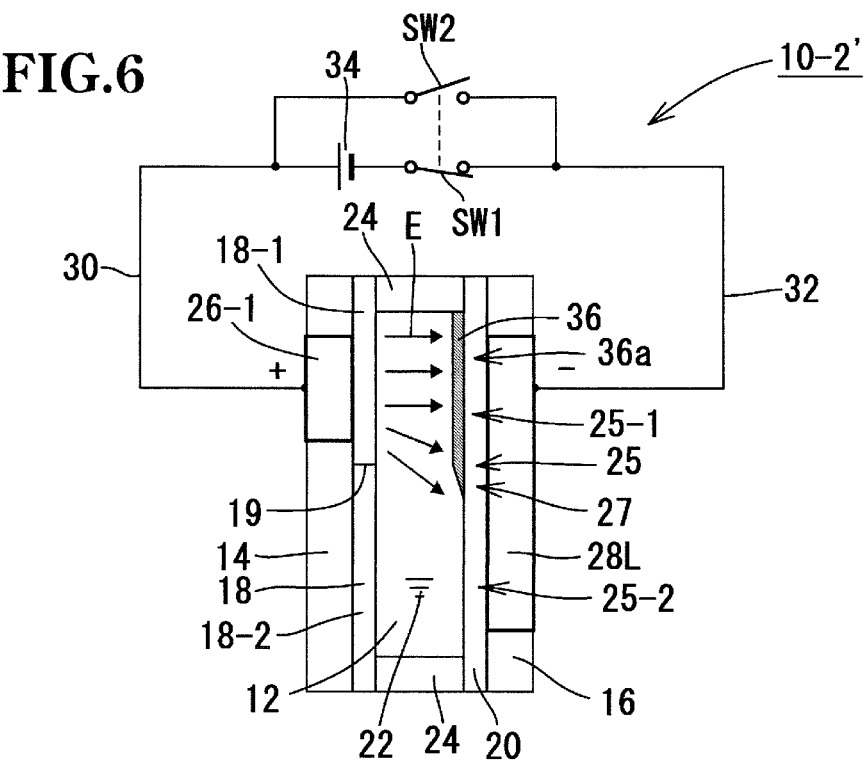
FIG. 6 is a diagram illustrating an alternation of the light transmissive element of Embodiment 1-2 illustrated in FIG. 4. This alternation is one obtained by inverting a polarity of a power supply of Embodiment 1-2 and is illustrated in comparison with FIG. 4C.

FIG. 6 illustrates an alternation of Embodiment 1-2. The light transmissive element 10-2' is one obtained by reversing a polarity of a direct-current power supply 34 in the light transmissive element 10-2 in FIG. 4. In other words, the light transmissive element 10-2' is one with a divisional area 18-1 set as a positive electrode and a transparent conductive film 20 set as a negative electrode. Upon a switch SW2 being turned off and a switch SW1 being turned on, a deposition layer 36 is deposited on the transparent conductive film 20. At this time, an electric field E from the divisional area 18-1 is directed straight toward the transparent conductive film 20 (in a direction orthogonal to a surface of the transparent conductive film 20) and also obliquely spreads toward an area of the transparent conductive film 20, the area obliquely facing the divisional area 18-1, across a dividing line 19. As a result, the deposition layer 36 on the surface of the transparent conductive film 20 is extended to the side on which the deposition layer 36 faces a divisional area 18-2. The extended part of the deposition layer 36 becomes smaller in thickness as is farther from the dividing line 19. Therefore, a transmittance change gradient at a boundary 27 between a low transmittance area 25-1 on the upper side of a light transmissive area 25 and a transmittance area 25-2 on the lower side of the light transmissive area 25 is gentle, and thus, the boundary 27 is blurred. Since the transparent conductive film 20 is not divided by a dividing line (that is, a negative potential is provided to an entire area of the transparent conductive film 20), if a voltage is continuously applied, the deposition layer 36 spreads toward the lower side in FIG. 6. Therefore, usage in which the area of the deposition layer 36 is variably controlled by the time of the application is also possible.

Embodiment 1-3

Figure 7:
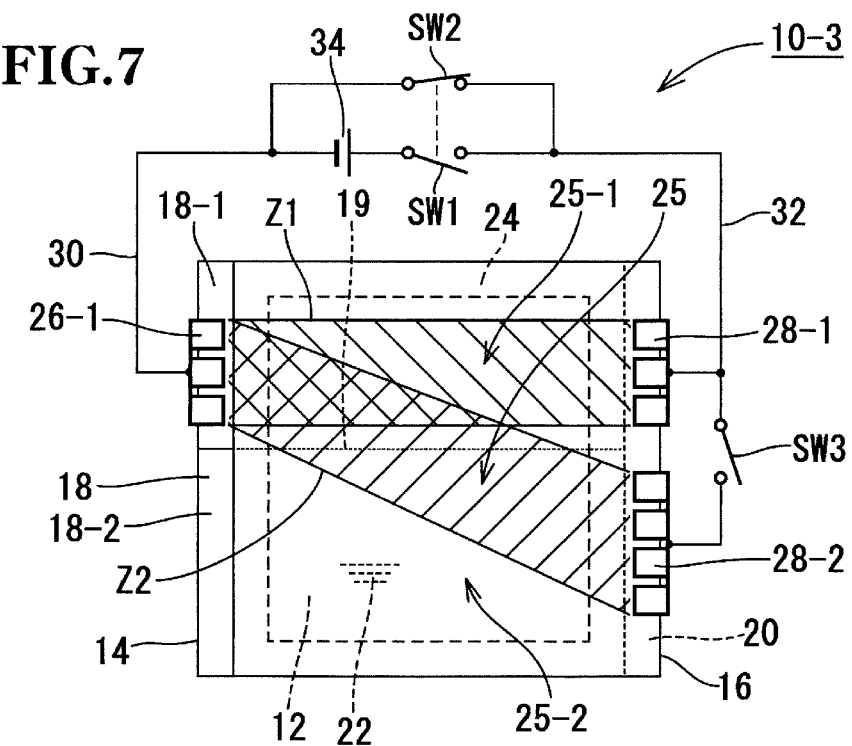
FIG. 7 is a schematic front view illustrating Embodiment 1-3 of a light transmissive element according to this invention in which metal electrodes and a drive circuit are added to the light transmissive element of Embodiment 1.

FIG. 7 illustrates Embodiment 1-3 of a light transmissive element according to this invention in which metal electrodes and a drive circuit are added to the light transmissive element 10 of Embodiment 1. As with Embodiments 1-1 and 1-2, the light transmissive element 10-3 is switchable between a state in which an entire light transmissive area 25 has a high transmittance and a state in which the light transmissive area 25 is segmented such that an area 25-1 facing a divisional area 18-1 has a low transmittance and an area 25-2 facing a divisional area 18-2 has a high transmittance. Also, in addition to the above, in the state in which the light transmissive area 25 is segmented into the low transmittance area and the high transmittance area, the light transmissive element 10-3 is switchable between a state in which a boundary between the areas is clear (state similar to the boundary 27 in FIGS. 2C and 3) and a state in which the boundary is blurred (state that is similar to the boundary 27 in FIGS. 4C and 5). The light transmissive element 10-3 is formed by adding a clip electrode 28-2 (second-second metal electrode) and a switch SW3 to the light transmissive element 10-1 of Embodiment 1-1 (FIGS. 2A to 2C). The clip electrode 28-1 (second-first metal electrode) is the same as the clip electrode 28 in FIGS. 2A and 2C and has a short length. A disposition position of the clip electrode 28-1 in the transparent conductive film 20 is also the same as that of the clip electrode 28 in FIGS. 2A to 2C. Here, Z1 is an area in a surface direction of the light transmissive element 10-3, the area being located between clip electrodes 26-1, 28-1. The area Z1 is an area located between a straight line connecting respective upper ends of the clip electrodes 26-1, 28-1 and a straight line connecting respective lower ends of the clip electrodes 26-1, 28-1 in the front view in FIG. 7. The clip electrodes 26-1, 28-1 are disposed at respective positions that allow the area Z1 to be present in the area facing the divisional area 18-1 and not to be present in the area facing the divisional area 18-2. Also, Z2 is an area in the surface direction of the light transmissive element 10-3, the area being located between the clip electrode 26-1 and the clip electrode 28-2. The area Z2 is an area located between a straight line connecting respective upper ends of the clip electrodes 26-1, 28-2 and a straight line connecting respective lower ends of the clip electrodes 26-1, 28-2 in the front view in FIG. 7. The clip electrode 28-2 is connected to a transparent conductive film 20 at a position where the area Z2 is present in both of the area facing the divisional area 18-1 and the area facing the divisional area 18-2 across a dividing line 19. The clip electrode 28-2 is connected to a positive electrode of a direct-current power supply 34 via a switch SW3 and a switch SW1.

The light transmissive element 10-3 provides the following states according to whether each of switches SW1 to SW3 is on or off.

When SW1 is off and SW2 is on, the entire light transmissive area 25 has a high transmittance.

When SW1 is on, SW2 is off and SW3 is off, the area 25-1 on the upper side has a low transmittance and the area 25-2 on the lower side has a high transmittance. The boundary between the low transmittance area and the high transmittance area is clear.

When SW1 is on, SW2 is off and SW3 is on, the area 25-1 on the upper side has a low transmittance and the area 25-2 on the lower side has a high transmittance. The boundary between the low transmittance area and the high transmittance area is blurred.

The light transmissive element 10-3 can be used, for example, as a half ND filter that has a filter function switchable between on and off states and is switchable between a hard-type and a soft-type. Also, the light transmissive element 10-3 can be used for a light control glass window for a building, a light control glass window for an automobile or an aircraft, or other purposes.

Embodiment 1-4

Figure 8:
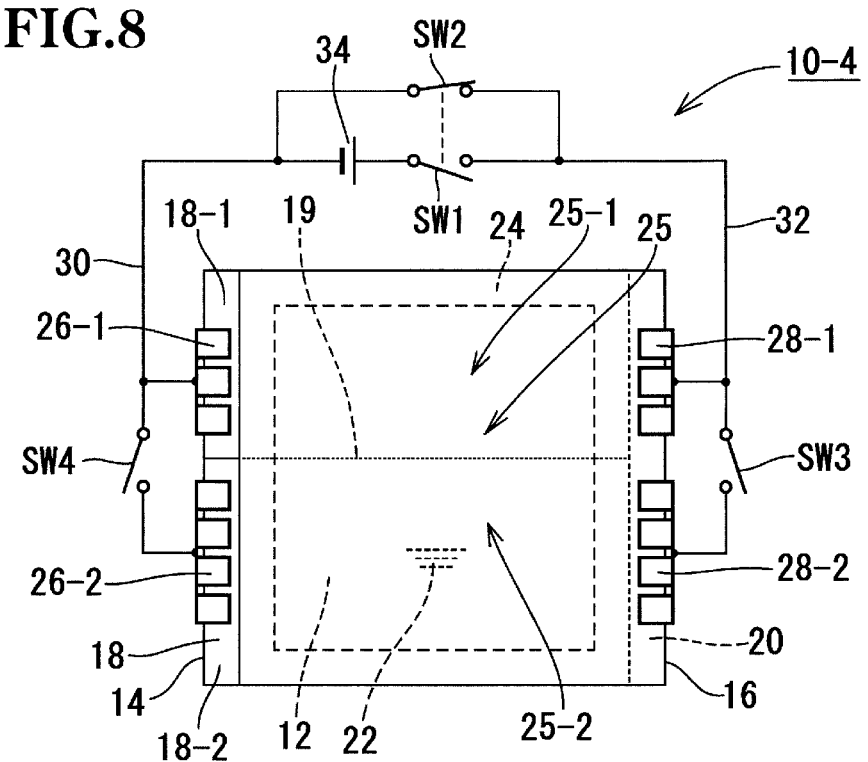
FIG. 8 is a schematic front view illustrating Embodiment 1-4 of a light transmissive element according to this invention in which metal electrodes and a drive circuit are added to the light transmissive element of Embodiment 1.

FIG. 8 illustrates Embodiment 1-4 of a light transmissive element according to this invention in which metal electrodes and a drive circuit are added to the light transmissive element 10 of Embodiment 1. This light transmissive element 10-4 is one that enables provision of a state in which the entire light transmissive area 25 has a low transmittance in addition to Embodiment 1-3. The light transmissive element 10-4 is formed by adding a clip electrode 26-2 (first-second metal electrode) and a switch SW4 to the light transmissive element 10-3 in FIG. 7 (or the light transmissive element 10-2 in FIG. 4). The clip electrode 26-2 is connected to a divisional area 18-2.

The light transmissive element 10-4 provides the following states according to whether each of switches SW1 to SW4 is on or off.

When SW1 is off and SW2 is on, the entire light transmissive area 25 has a high transmittance.

When SW1 is on, SW2 is off and SW3 and SW4 are both off, an area 25-1 on the upper side has a low transmittance and an area 25-2 on the lower side has a high transmittance. A boundary between the low transmittance area and the high transmittance area is clear.

When SW1 is on, SW2 is off, SW3 is on and SW4 is off (or SW3 is off and SW4 is on), the area 25-1 on the upper side has a low transmittance and the area 25-2 on the lower side has a high transmittance. The boundary between the low transmittance area and the high transmittance area is blurred.

When SW1 is on, SW2 is off and SW3 and SW4 are both on, the entire light transmissive area 25 has a low transmittance.

The light transmissive element 10-4 can be used, for example, as a ND filter that has a filter function switchable between on and off states and is switchable among a hard-type half ND filter, a soft-type half ND filter and a full (whole area) ND filter. Also, the light transmissive element 10-4 can be used for a light control glass window for a building, a light control glass window for an automobile or an aircraft, or other purposes.

Embodiment 2

Figure 9A:
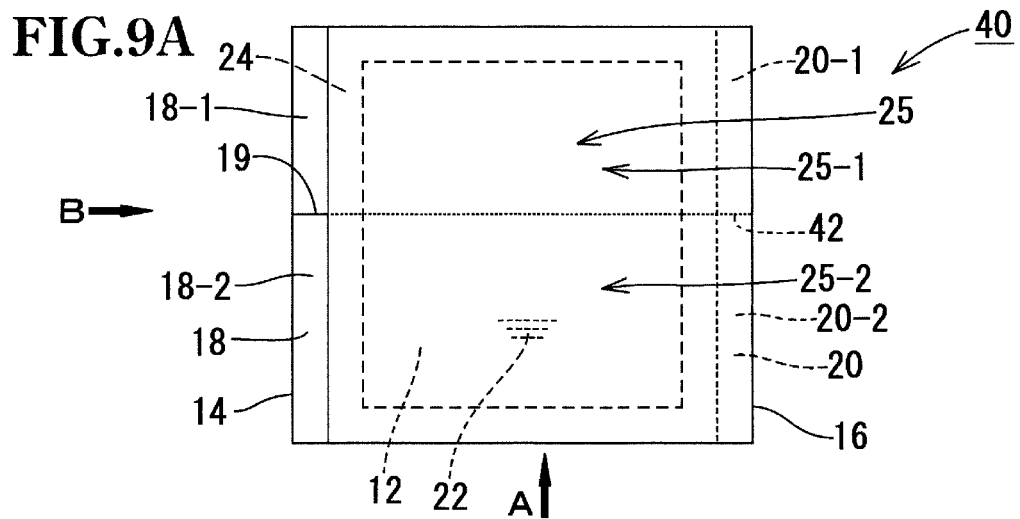
FIG. 9A is a schematic front view illustrating Embodiment 2 of a light transmissive element according to this invention.
Figure 9B:
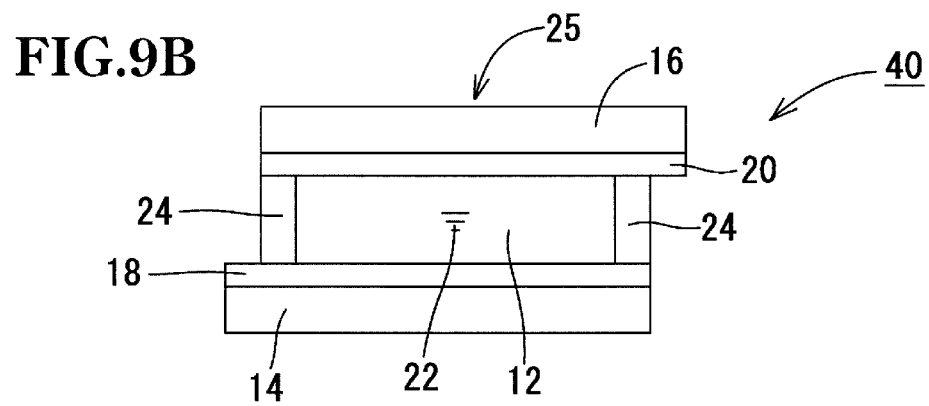
FIG. 9B is a schematic transparent view in the arrow A direction in FIG. 9A.
Figure 9C:
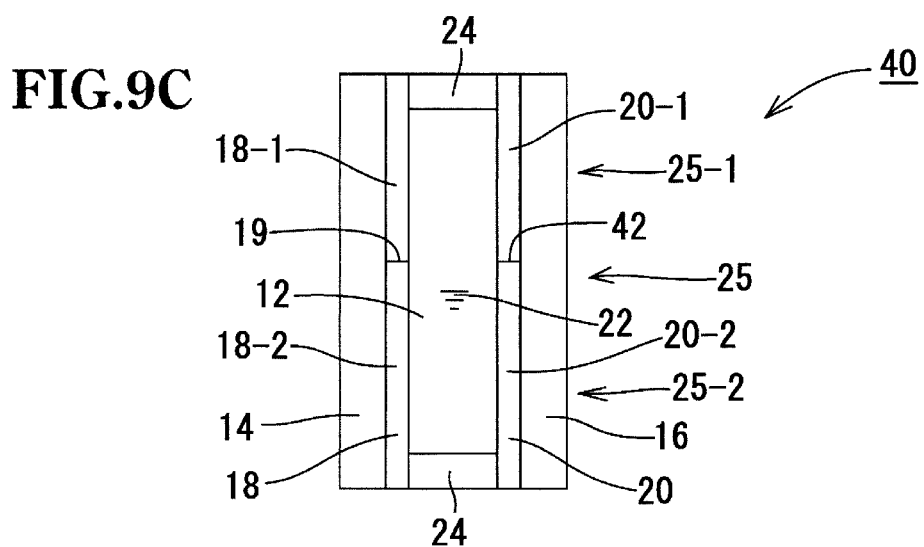
FIG. 9C is a schematic transparent view in the arrow B direction in FIG. 9A.

FIG. 9 (FIGS. 9A to 9C) illustrate Embodiment 2 of a light transmissive element according to this invention. This light transmissive element 40 of Embodiment 2 is one with a dividing line formed in each of transparent conductive films facing each other. The rest of configuration is the same as that of the light transmissive element 10 of Embodiment 1 (FIG. 1). In Embodiment 2 (including Embodiments 2-1 to 2-4), for each of parts that are in common with Embodiment 1 (including Embodiments 1-1 to 1-4), a reference numeral that is the same as that of Embodiment 1 is used. In FIG. 9, in a transparent conductive film 20, a dividing line 42 (second dividing line) is formed at a position at which the dividing line 42 overlaps a dividing line 19 (first dividing line) of a transparent conductive film 18, via, e.g., laser cutting or chemical etching. The dividing line 42 is linearly drawn between two edges of the transparent conductive film 20 having a rectangular planar shape, the two edges opposite to each other in a left-right direction in FIG. 9A, so as to reach the two edges. Consequently, the transparent conductive film 20 is divided in two rectangular divisional areas, a divisional area 20-1 (second-first divisional area) and a divisional area 20-2 (second-second divisional area). The divisional areas 20-1, 20-2 are electrically insulated from each other.

Embodiment 2-1

Figure 10:
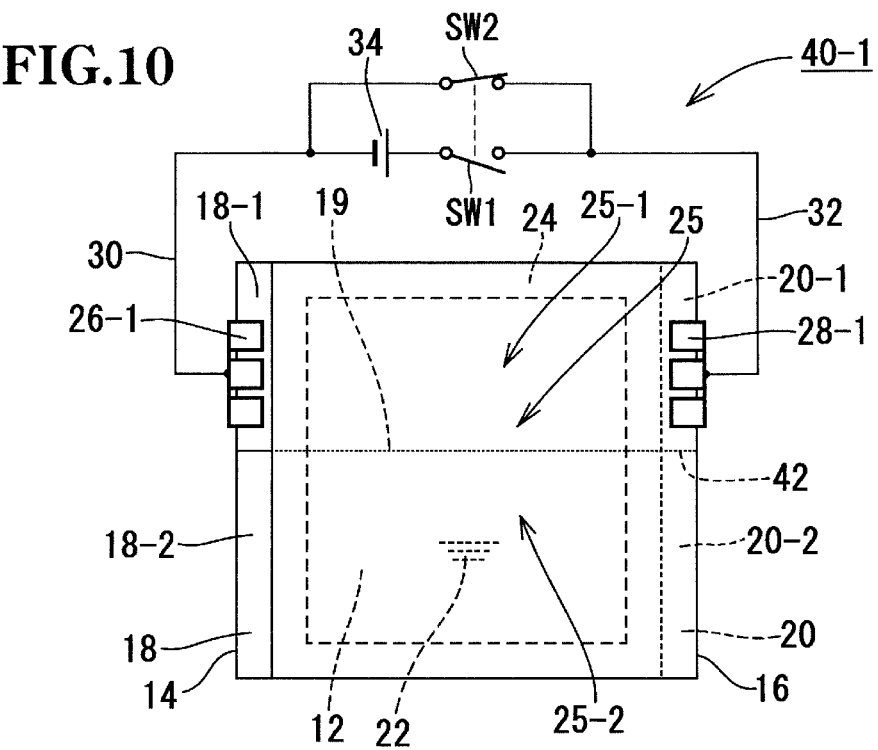
FIG. 10 is a schematic front view illustrating Embodiment 2-1 of a light transmissive element according to this invention in which metal electrodes and a drive circuit are added to the light transmissive element of Embodiment 2.

FIG. 10 illustrates Embodiment 2-1 of a light transmissive element according to this invention in which metal electrodes and a drive circuit are added to the light transmissive element 40 of Embodiment 2. This light transmissive element 40-1 has a configuration that is the same as that of the light transmissive element 10-1 of Embodiment 1-1 (FIG. 2) except that a dividing line 42 is formed in a transparent conductive film 20. In this light transmissive element 40-1, even if a polarity of a direct-current power supply 34 is reversed and a deposition layer is deposited on the divisional area 20-1 side, a clear boundary can be provided between a low transmittance area and a high transmittance area because the divisional area 20-1 and a divisional area 20-2 are electrically disconnected from (that is, electrically insulated from) each other via the dividing line 42. In other words, with the light transmissive element 40-1, polarities of clip electrodes 26-1, 28-1 can arbitrarily be set and a clear boundary can be provided in either case.

Embodiment 2-2

Figure 11:
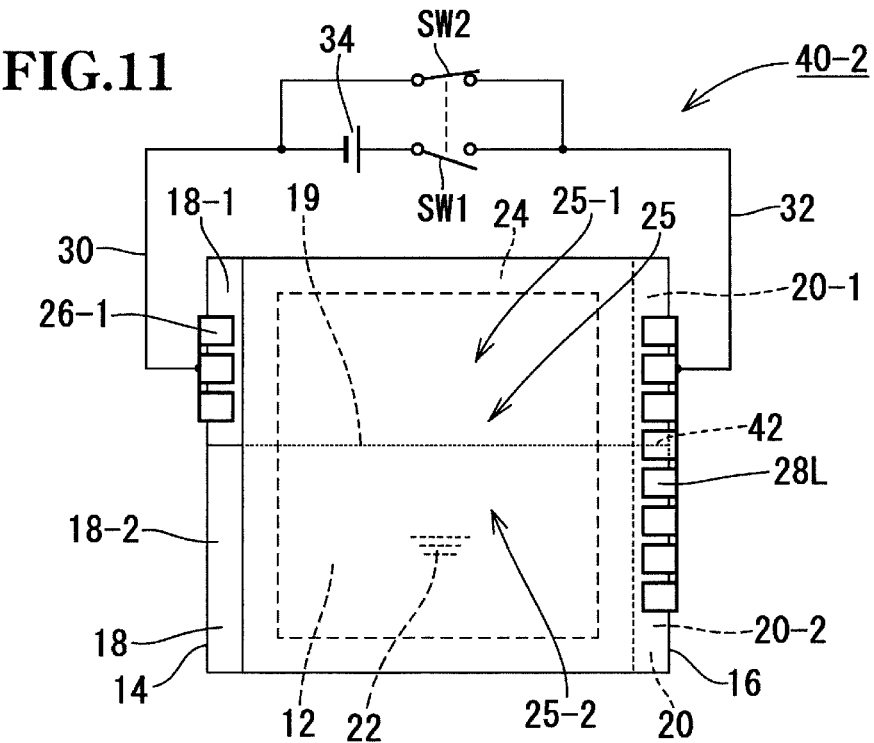
FIG. 11 is a schematic front view illustrating Embodiment 2-2 of a light transmissive element according to this invention in which metal electrodes and a drive circuit are added to the light transmissive element of Embodiment 2.

FIG. 11 illustrates Embodiment 2-2 of a light transmissive element according to this invention in which metal electrodes and a drive circuit are added to the light transmissive element 40 of Embodiment 2. This light transmissive element 40-2 has a configuration that is the same as that of the light transmissive element 10-2 of Embodiment 1-2 (FIG. 4) except that a dividing line 42 is formed in a transparent conductive film 20. This light transmissive element 40-2 can substantially operate like the light transmissive element 10-2 of Embodiment 1-2 because a divisional area 20-1 and a divisional area 20-2 are short-circuited via a long clip electrode 28L. In a state in which the light transmissive element 40-2 is segmented into a low transmittance area and a high transmittance area, a blurred boundary can be provided between the areas. As with the alternation (FIG. 6) of Embodiment 1-2, the light transmissive element 40-2 can be used with a polarity of a direct-current power supply 34 reversed.

Embodiment 2-3

Figure 12:
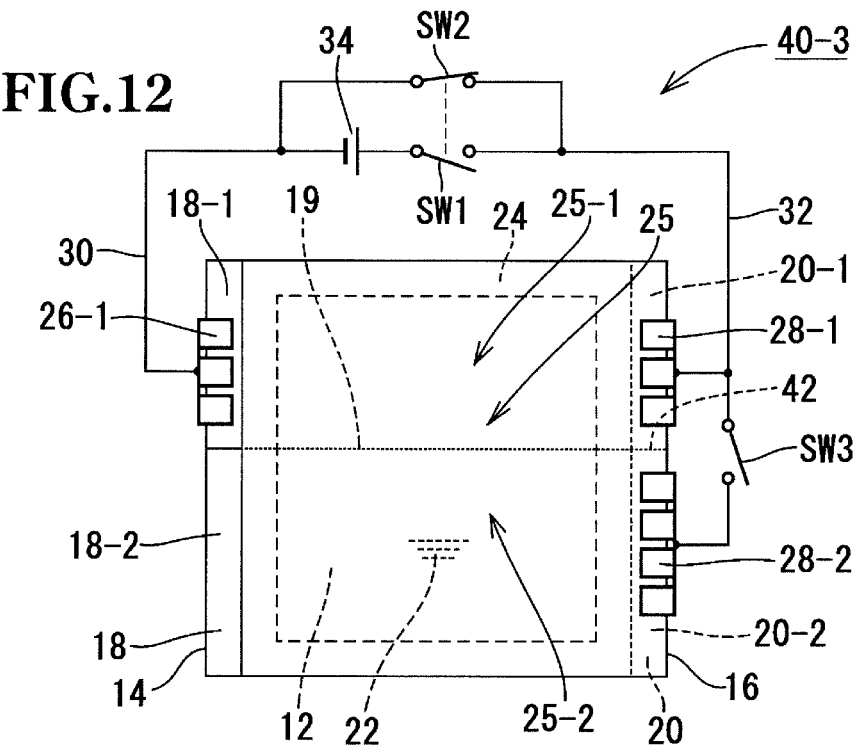
FIG. 12 is a schematic front view illustrating Embodiment 2-3 of a light transmissive element according to this invention in which metal electrodes and a drive circuit are added to the light transmissive element of Embodiment 2.

FIG. 12 illustrates Embodiment 2-3 of a light transmissive element according to this invention in which metal electrodes and a drive circuit are added to the light transmissive element 40 of Embodiment 2. This light transmissive element 40-3 has a configuration that is the same as that of the light transmissive element 10-3 of Embodiment 1-3 (FIG. 7) except that a dividing line 42 is formed in a transparent conductive film 20. This light transmissive element 40-3 provides states that are those of the light transmissive element 10-3 of Embodiment 1-3, according to whether each of switches SW1 to SW3 is on or off. The light transmissive element 40-3 can also be used with a polarity of a direct-current power supply 34 reversed.

Embodiment 2-4

Figure 13:
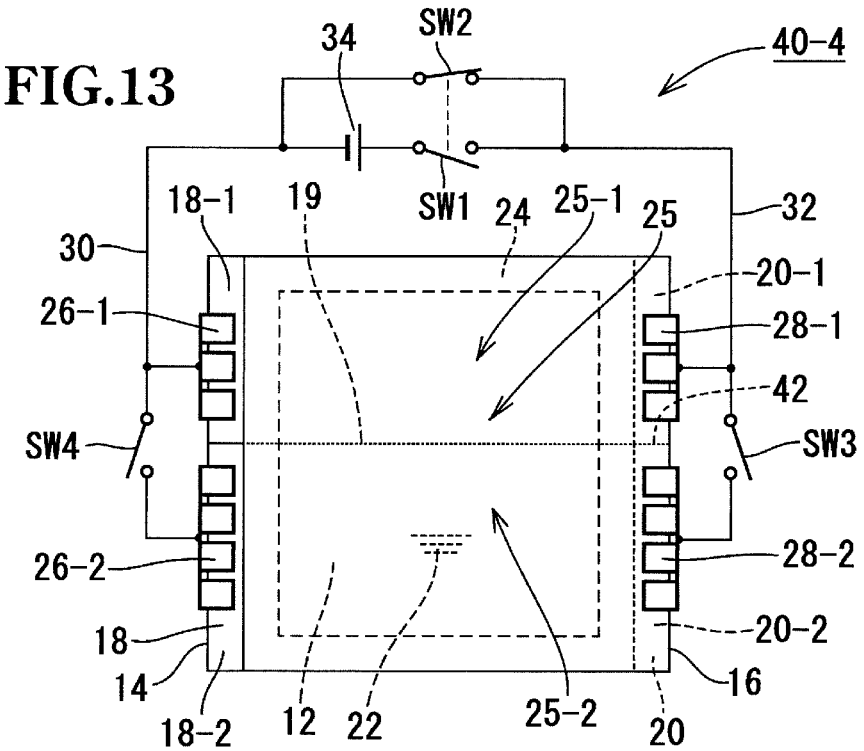
FIG. 13 is a schematic front view illustrating Embodiment 2-4 of a light transmissive element according to this invention in which metal electrodes and a drive circuit are added to the light transmissive element of Embodiment 2.

FIG. 13 illustrates Embodiment 2-4 of a light transmissive element according to this invention in which metal electrodes and a drive circuit are added to the light transmissive element 40 of Embodiment 2. This light transmissive element 40-4 has a configuration that is the same as that of the light transmissive element 10-4 of Embodiment 1-4 (FIG. 8) except that a dividing line 42 is formed in a transparent conductive film 20. In other words, the light transmissive element 40-4 is formed by adding a clip electrode 26-2 and a switch SW4 to the light transmissive element 40-3 of Embodiment 2-3 (FIG. 12). The light transmissive element 40-4 may be formed by adding a clip electrode 26-2 and a switch SW4 to the light transmissive element 40-2 of Embodiment 2-2 (FIG. 11). This light transmissive element 40-4 provides states that are those of the light transmissive element 10-4 of Embodiment 1-4, according to whether each of switches SW1 to SW4 is on or off. The light transmissive element 40-4 can also be used with a polarity of a direct-current power supply 34 reversed.

As with the light transmissive elements 10-1 to 10-4 of Embodiments 1-1 to 1-4, each of the light transmissive elements 40-1 to 40-4 of Embodiments 2-1 to 2-4 can be used, for example, for a ND filter for a camera, a light control glass window for a building, a light control glass window for an automobile or an aircraft, or other purposes.

The light transmissive element according to this invention is not limited to the configurations indicated in the above-described embodiments.

For example, the following changes are possible.

Although in the above-described embodiments, a value of a voltage applied to the light transmissive element is fixed, the present invention is not limited to this case. In other words, a transmittance of a light transmissive area can be made adjustable in a stepwise or stepless manner by making a voltage applied between transparent conductive films facing each other changeable in a stepwise or stepless manner. Alternatively, a transmittance of a light transmissive area can be made adjustable in a stepwise or stepless manner by making a voltage applied between transparent conductive films facing each other be a voltage obtained by subjecting a direct-current voltage (direct-current voltage having a magnitude that provides a desired lowest transmittance) to pulse width modulation and making a duty ratio of a pulse provided by the pulse width modulation changeable in a stepwise or stepless manner.

The electrolyte used in this invention is not limited to those indicated in the above-described embodiments. Any of various electrolytes prepared so as to allow metal ions to be reversibly deposited according to application of a voltage (for example, any of the electrolytes described in the cited documents listed in the pamphlet of International Publication No. WO 2015/093298 filed by the present applicant) can be used.

Although in the above-described embodiments, a positive metal electrode and a negative metal electrode are disposed on edges of a transparent substrate, the edges opposite to each other, the present invention is not limited to this case and a positive metal electrode and a negative metal electrode can be disposed on non-opposite edges. Also, a metal electrode having a same polarity can be disposed not only on one edge but also on a plurality of edges of a transparent substrate.

Although in the above-described embodiments, each dividing line is formed in the shape of a straight line, the present invention is not limited to this case. For example, each dividing line can be formed in the shape of, e.g., a circle.

Although the above-described embodiments, a single dividing line is formed in a transparent conductive film on one side, the present invention is not limited to this case. In other words, a transparent conductive film on one side can be divided in three or more areas by forming a plurality of dividing lines in the transparent conductive film.

The invention claimed is:

1. A light transmissive element including a light transmissive area, the light transmissive element comprising:
    first and second transparent substrates disposed so as to face each other across a gap,
    first and second transparent conductive films formed on facing surfaces of the first and second substrates, respectively; and
    an electrolyte filled in the gap, wherein
    the electrolyte contains a metal ion and is prepared so as to allow the metal ion to be reversibly deposited on a surface of the first transparent conductive film or the second transparent conductive film via electrodeposition according to a state of applied voltage between the first transparent conductive film and the second transparent conductive film,
    in the light transmissive area, a first dividing line is formed in the first transparent conductive film,
    the first transparent conductive film includes a first-first divisional area and a first-second divisional area in the light transmissive area, the first-first divisional area and the first-second divisional area being electrically insulated from each other by the first dividing line,
    in the light transmissive area, the second transparent conductive film includes a continuous area with no dividing line,
    the light transmissive element includes a first-first metal electrode and a second metal electrode,
    the first-first metal electrode is connected to the first-first divisional area and is not connected to the first-second divisional area,
    the second metal electrode is connected to the second transparent conductive film, and
    the second metal electrode is connected to the second transparent conductive film at a position where an area, defined by straight lines connecting respective ends of the first-first metal electrode and the second metal electrode with regard to a surface direction of the light transmissive element, is in both the first-first divisional area and the first-second divisional area and not in at least a portion of the first-second divisional area.

2. A light transmissive element including a light transmissive area, the light transmissive element comprising:
    first and second transparent substrates disposed so as to face each other across a gap,
    first and second transparent conductive films formed on facing surfaces of the first and second substrates, respectively; and
    an electrolyte filled in the gap, wherein
    the electrolyte contains a metal ion and is prepared so as to allow the metal ion to be reversibly deposited on a surface of the first transparent conductive film or the second transparent conductive film via electrodeposition according to a state of applied voltage between the first transparent conductive film and the second transparent conductive film,
    in the light transmissive area, a first dividing line is formed in the first transparent conductive film,
    the first transparent conductive film includes a first-first divisional area and a first-second divisional area in the light transmissive area, the first-first divisional area and the first-second divisional area being electrically insulated from each other by the first dividing line,
    in the light transmissive area, the second transparent conductive film includes a continuous area with no dividing line,
    the light transmissive element includes a first-first metal electrode and a second metal electrode,
    the first-first metal electrode is connected to the first-first divisional area and is not connected to the first-second divisional area,
    the second metal electrode is connected to the second transparent conductive film,
    the second metal electrode includes a second-first metal electrode and a second-second metal electrode separated from each other,
    the second-first metal electrode is connected to the second transparent conductive film at a position where an area located between the first-first metal electrode and the second-first metal electrode with regard to a surface direction of the light transmissive element is present in an area facing the first-first divisional area and is not present in an area facing the first-second divisional area, and
    the second-second metal electrode is connected to the second transparent conductive film at a position where an area located between the first-first metal electrode and the second-second metal electrode with regard to the surface direction of the light transmissive element is present in an area facing both the first-first divisional area and the first-second divisional area.

3. A light transmissive element including a light transmissive area, the light transmissive element comprising:
    first and second transparent substrates disposed so as to face each other across a gap,
    first and second transparent conductive films formed on facing surfaces of the first and second substrates, respectively; and an electrolyte filled in the gap, wherein
the electrolyte contains a metal ion and is prepared so as to allow the metal ion to be reversibly deposited on a surface of the first transparent conductive film or the second transparent conductive film via electrodeposition according to a state of applied voltage between the first transparent conductive film and the second transparent conductive film,
in the light transmissive area, a first dividing line is formed in the first transparent conductive film,
the first transparent conductive film includes a first-first divisional area and a first-second divisional area in the light transmissive area, the first-first divisional area and the first-second divisional area being electrically insulated from each other by the first dividing line,
in the light transmissive area, a second dividing line is formed in the second transparent conductive film, and
the second transparent conductive film includes a second-first divisional area and a second-second divisional area in the light transmissive area, the second-first divisional area and the second-second divisional area being electrically insulated from each other by the second dividing line.

4. The light transmissive element according to claim 3, wherein:
in the light transmissive area, the first dividing line and the second dividing line are formed at respective positions at which the first dividing line and the second dividing line overlap each other; and
the first-first divisional area and the second-first divisional area are disposed so as to face each other and the first-second divisional area and the second-second divisional area are disposed so as to face each other.

5. The light transmissive element according to claim 4, wherein:
the light transmissive element includes a first-first metal electrode and a second metal electrode;
the first-first metal electrode is connected to the first-first divisional area and is not connected to the first-second divisional area; and
the second metal electrode is connected to the second-first divisional area and is not connected to the second-second divisional area.

6. The light transmissive element according to claim 4, wherein:
the light transmissive element includes a first-first metal electrode and a second metal electrode;
the first-first metal electrode is connected to the first-first divisional area and is not connected to the first-second divisional area; and
the second metal electrode is connected to the second-first divisional area and the second-second divisional area.

7. The light transmissive element according to claim 6, wherein:
the second metal electrode includes a second-first metal electrode and a second-second metal electrode separated from each other;
the second-first metal electrode is connected to the second-first divisional area and is not connected to the second-second divisional area; and
the second-second metal electrode is connected to the second-second divisional area and is not connected to the second-first divisional area.

8. The light transmissive element according to claim 1, wherein:
the light transmissive element further includes a first-second metal electrode; and
the first-second metal electrode is connected to the first-second divisional area and is not connected to the first-first divisional area.

9. The light transmissive element according to claim 2, wherein:
the light transmissive element further includes a first-second metal electrode; and
the first-second metal electrode is connected to the first-second divisional area and is not connected to the first-first divisional area.

10. The light transmissive element according to claim 6, wherein:
the light transmissive element further includes a first-second metal electrode; and
the first-second metal electrode is connected to the first-second divisional area and is not connected to the first-first divisional area.

11. The light transmissive element according to claim 7, wherein:
the light transmissive element further includes a first-second metal electrode; and
the first-second metal electrode is connected to the first-second divisional area and is not connected to the first-first divisional area.

* * * * *